US008414776B2

(12) United States Patent
Hale

(10) Patent No.: US 8,414,776 B2
(45) Date of Patent: Apr. 9, 2013

(54) METHOD, APPARATUS, AND MAGNET FOR MAGNETICALLY TREATING FLUIDS

(75) Inventor: John T. Hale, Concord, NC (US)

(73) Assignee: RFG Technology Partners LLC, Sarasota, FL (US)

( * ) Notice: Subject to any disclaimer, the term of this patent is extended or adjusted under 35 U.S.C. 154(b) by 0 days.

(21) Appl. No.: 12/682,013

(22) PCT Filed: Oct. 8, 2008

(86) PCT No.: PCT/US2008/079179
§ 371 (c)(1), (2), (4) Date: Apr. 7, 2010

(87) PCT Pub. No.: WO2009/048935
PCT Pub. Date: Apr. 16, 2009

(65) Prior Publication Data

US 2010/0206732 A1 Aug. 19, 2010

Related U.S. Application Data

(60) Provisional application No. 60/978,387, filed on Oct. 8, 2007.

(51) Int. Cl.
*C02F 1/48* (2006.01)
*F04B 53/00* (2006.01)

(52) U.S. Cl.
USPC ........... 210/695; 210/222; 210/243; 335/302; 335/306; 204/554; 204/557; 204/559; 204/660; 166/66.5; 166/68.5; 166/304

(58) Field of Classification Search .................. 210/695, 210/222, 243; 335/302, 306; 204/554, 557, 204/559, 660; 166/66.5, 68.5, 304
See application file for complete search history.

(56) References Cited

U.S. PATENT DOCUMENTS

| | | | |
|---|---|---|---|
| 3,947,533 | A | 3/1976 | Davis |
| 3,951,807 | A | 4/1976 | Sanderson |
| 4,026,805 | A | 5/1977 | Fowler |
| 4,033,151 | A | 7/1977 | Jansen |
| 4,050,426 | A | 9/1977 | Sanderson |
| 4,054,270 | A | 10/1977 | Gugger |
| 4,065,361 | A | 12/1977 | Hanson |
| 4,110,222 | A | 8/1978 | Watson |
| 4,146,479 | A | 3/1979 | Brown |

(Continued)

FOREIGN PATENT DOCUMENTS

| | | |
|---|---|---|
| DE | 202005014091 | 11/2005 |
| GB | 2257932 | 1/1993 |

(Continued)

OTHER PUBLICATIONS

"International Search Report" and "Written Opinion of the International Searching Authority" (European Patent Office) in corresponding International Patent Application No. PCT/US2008/079179, dated Oct. 8, 2009, 17 pages.

*Primary Examiner* — David A Reifsnyder
(74) *Attorney, Agent, or Firm* — Pedigo Law Firm, PLLC

(57) ABSTRACT

A sucker-rod pumping system includes diametrically charged rare earth magnets having significant monopolar character mounted on the rod string and, optionally, within a magnet barrel below the pump barrel. The magnets are jacketed to preclude contact with crude petroleum. The magnets subject the petroleum to a significant magnetic flux to substantially preclude precipitation of paraffins and asphaltenes with a minimum of retrofit to existing equipment and without substantially altering the operation of the rod string.

20 Claims, 7 Drawing Sheets

U.S. PATENT DOCUMENTS

| | | | |
|---|---|---|---|
| 4,153,559 | A | 5/1979 | Sanderson |
| 4,157,963 | A | 6/1979 | Jessop |
| 4,188,296 | A | 2/1980 | Fujita |
| 4,189,243 | A | 2/1980 | Black |
| 4,210,535 | A | 7/1980 | Risk |
| 4,216,092 | A | 8/1980 | Shalhoob et al. |
| 4,265,746 | A | 5/1981 | Zimmerman et al. |
| 4,265,754 | A | 5/1981 | Menold |
| 4,265,755 | A | 5/1981 | Zimmerman |
| 4,278,549 | A | 7/1981 | Abrams |
| 4,289,621 | A | 9/1981 | O'Meara |
| 4,299,700 | A | 11/1981 | Sanderson |
| 4,299,701 | A | 11/1981 | Garrett |
| D262,306 | S | 12/1981 | Carpenter |
| D262,987 | S | 2/1982 | Carpenter |
| 4,320,003 | A | 3/1982 | Sanderson |
| 4,357,237 | A | 11/1982 | Sanderson |
| 4,366,053 | A | 12/1982 | Lindler |
| 4,367,143 | A | 1/1983 | Carpenter |
| 4,372,852 | A | 2/1983 | Kovacs |
| 4,390,423 | A | 6/1983 | Sundt |
| 4,414,951 | A | 11/1983 | Saneto |
| 4,417,984 | A | 11/1983 | O'Meara |
| 4,422,935 | A | 12/1983 | Mattingly |
| 4,428,837 | A | 1/1984 | Kronenberg |
| 4,455,229 | A | 6/1984 | Sanderson et al. |
| 4,512,289 | A | 4/1985 | Collins |
| 4,519,919 | A | 5/1985 | Whyte |
| 4,564,448 | A | 1/1986 | O'Meara |
| 4,568,901 | A | 2/1986 | Adam |
| 4,569,737 | A | 2/1986 | Sakata |
| 4,585,553 | A | 4/1986 | Hikosaka et al. |
| 4,601,823 | A | 7/1986 | Beck |
| 4,605,498 | A | 8/1986 | Kulish |
| 4,611,615 | A | 9/1986 | Petrovic |
| 4,711,271 | A | 12/1987 | Weisenbarger |
| 4,716,024 | A | 12/1987 | Pera |
| 4,808,306 | A | 2/1989 | Mitchell |
| 4,834,870 | A | 5/1989 | Osterberg et al. |
| 4,858,644 | A | 8/1989 | Decker |
| 4,879,045 | A | 11/1989 | Eggerichs |
| 4,933,151 | A | 6/1990 | Song |
| 4,946,590 | A | 8/1990 | Hertzog |
| 5,012,842 | A | 5/1991 | Savard |
| 5,024,271 | A | 6/1991 | Meihua |
| 5,052,491 | A | 10/1991 | Harms et al. |
| 5,078,870 | A | 1/1992 | Carpenter |
| 5,099,876 | A | 3/1992 | Rosenberg |
| 5,122,277 | A | 6/1992 | Jones |
| 5,144,980 | A | 9/1992 | Rosenberg |
| 5,178,757 | A | 1/1993 | Corney |
| 5,198,106 | A | 3/1993 | Carpenter |
| 5,238,558 | A | 8/1993 | Curtis |
| 5,296,141 | A | 3/1994 | Ellison |
| 5,348,050 | A | 9/1994 | Ashton |
| 5,435,351 | A | 7/1995 | Head |
| 5,453,188 | A | 9/1995 | Florescu |
| 5,454,943 | A | 10/1995 | Ashton et al. |
| 5,575,974 | A | 11/1996 | Wurzburger et al. |
| 5,584,994 | A | 12/1996 | Hattori |
| 5,673,721 | A | 10/1997 | Alcocer |
| 5,700,376 | A | 12/1997 | Carpenter |
| 5,716,520 | A | 2/1998 | Mason |
| 5,738,766 | A | 4/1998 | Jefferson |
| 5,752,547 | A | 5/1998 | Rosenberg |
| 5,766,461 | A | 6/1998 | Kampf |
| 5,783,074 | A | 7/1998 | Stanley |
| 5,816,226 | A | 10/1998 | Jernigan et al. |
| 5,837,143 | A | 11/1998 | Mercier |
| 5,866,010 | A | 2/1999 | Bogatin et al. |
| 5,904,839 | A | 5/1999 | Brons |
| 5,959,194 | A | 9/1999 | Nenniger |
| 5,992,398 | A | 11/1999 | Ho |
| 6,007,715 | A | 12/1999 | Liu |
| 6,008,710 | A | 12/1999 | Coates |
| 6,012,521 | A | 1/2000 | Zunkel |
| 6,068,768 | A | 5/2000 | Carpenter |
| 6,112,808 | A | 9/2000 | Isted |
| 6,123,843 | A | 9/2000 | Schoepe |
| 6,158,421 | A | 12/2000 | Hsieh |
| 6,230,796 | B1 | 5/2001 | Tovar De Pablos |
| 6,241,015 | B1 | 6/2001 | Pringle et al. |
| 6,257,356 | B1 | 7/2001 | Wassell |
| 6,277,275 | B1 | 8/2001 | Yoshifusa |
| 6,602,411 | B1 | 8/2003 | Aida et al. |
| 6,616,837 | B2 | 9/2003 | Tovar De Pablos |
| 6,655,462 | B1 | 12/2003 | Carmichael |
| 6,733,668 | B2 | 5/2004 | Pedersen et al. |
| 6,755,968 | B2 | 6/2004 | Sato |
| D500,118 | S | 12/2004 | Flick |
| 6,831,540 | B1 | 12/2004 | Lin |
| 6,890,432 | B1 | 5/2005 | Witz |
| 6,901,917 | B2 | 6/2005 | Muller |
| D511,198 | S | 11/2005 | Flick |
| 6,959,640 | B2 | 11/2005 | Flick |
| 7,004,153 | B2 | 2/2006 | Lisseveld |
| D516,666 | S | 3/2006 | Goran |
| 7,353,873 | B2 | 4/2008 | Borst et al. |
| 7,357,862 | B2 | 4/2008 | White |
| 2005/0274524 | A1 | 12/2005 | Silguero |
| 2008/0149548 | A1 | 6/2008 | White |

FOREIGN PATENT DOCUMENTS

| | | | |
|---|---|---|---|
| RU | 2208591 | C1 | 7/2003 |
| RU | 2235690 | C2 | 9/2004 |
| RU | 2289037 | C2 | 12/2006 |
| WO | 81/02529 | | 9/1981 |
| WO | 2006/010124 | A | 1/2006 |

METHOD, APPARATUS, AND MAGNET FOR MAGNETICALLY TREATING FLUIDS

CROSS-REFERENCE TO RELATED APPLICATIONS

This application claims the benefit of priority based on U.S. Provisional Patent Application Ser. No. 60/978,387 filed in the United States Patent and Trademark Office on Oct. 8, 2007, which is hereby incorporated by reference in its entirety.

FIELD OF THE INVENTION

This invention relates to methods and apparatus for exposing fluids to magnetic fields and to magnets for fluid treatment. More specifically, this invention relates to apparatus, methods, and magnets used in connection with sucker-rod pumping for the removal of crude petroleum from underground reservoirs.

BACKGROUND OF THE INVENTION

Sucker-rod pumping is a long established method for artificially lifting crude petroleum from an oil well. The components of a sucker-rod pumping system are immediately recognizable world-wide, especially the horse head and walking beam that commonly form the above-ground components of the subsurface pump. The above-ground components normally include a prime mover for providing driving power to the system, including gasoline and diesel engines and electric motors; a gear reducer for obtaining the necessary torque and pumping speed; a mechanical linkage for converting rotational motion to reciprocating motion, which includes the walking beam; a polished rod connecting the walking beam to the sucker-rod string; and a well-head assembly, sometimes referred to as a "Christmas tree," which seals on the polished rod to keep fluids within the well and includes a pumping tee for removing oil to flow lines for storage and processing. Below ground, the downhole equipment may include a well hole casing; tubing within the casing and through which the oil is withdrawn; a rod string centrally located within the downhole tubing and composed of sections of sucker rod coupled to provide the necessary mechanical link between the polished rod and the subsurface pump; a pump plunger comprising a traveling ball valve and connected directly to the rod string to lift the liquid in the tubing; and a pump barrel, which is the stationary cylinder of the subsurface pump and contains a standing ball valve for suction of liquid into the barrel during the upstroke.

Sucker-rod pump operations sometimes have used magnets, including rare earth magnets, to assist in overcoming or delaying the precipitation of solids that can preclude a well from flowing and producing. Exposure to a magnetic field can delay or preclude precipitation of paraffins, asphaltines, and the like solids from crude petroleum as it cools, which precipitation tends to cause friction losses that can place stress on the rod string components or shut the well down. Typically, these magnets have been axially magnetized along a longitudinal axis, and may include rectangular or cylindrical magnets, generally placed on the production tubing exterior surface to expose fluid in the tubing to a magnetic field. Some of the apparatus that have been proposed require extensive retrofitting and may not offer a practical solution given the demands of production in the oil field.

Magnets sometimes are placed above ground to reduce scale and solids precipitation in the oil lines. Magnets are also used in connection with a wide variety of fluids conditioning apparatus, including for exposing water, vegetable oils, and other fluids to a magnetic field, typically for the purpose of aligning polar substances within the fluid to preclude or reduce solids deposition or to retrieve metallic objects from the fluid. For example, magnets have been placed on the end of a rod string for collection and removal of metallic contaminants from an oil well, but these tools generally cannot be used for removal of oil from the well.

It would be desirable to develop more efficient and useful methods and apparatus for exposing fluids to magnetic fields, including devices that do not require extensive retrofitting of existing apparatus, can potentially expose the fluid to an increased intensity of magnetic field, and that do not interfere with the operation of existing apparatus.

SUMMARY OF THE INVENTION

The invention provides an intense magnetic field through which a fluid travels and is relatively easily installed on existing equipment without extensive retrofitting. The apparatus comprises at least one matched pair of conjoined rare earth magnets of opposite polarity, in which each magnet has radially inward facing and radially outward facing arcuate surfaces that extend axially in a longitudinal direction to create an elongated half cylinder shape. The inner and outer arcuate surfaces terminate in a transverse direction to form a pair of flat surfaces connecting the inner arcuate surface to the outer surface. Each magnet is diametrically charged with its inner and outer surfaces having the same polarity. The pair of flat surfaces for each magnet have the same polarity, and this polarity is opposite that of the arcuate surfaces. The matched pair of magnets typically are conjoined by placing their flat, oppositely charged surfaces in magnetic field contact.

In the case of a sucker-rod pumping system, diametrically charged matched sets of magnets of opposite polarity may be conjoined about the reduce diameter portion of a sucker-rod, which is sometimes termed the sucker rod stem or rod body. The oil or other fluid flowing past is subjected to an intense magnetic field. The magnets may be mounted on the sucker rod stem in the absence of an extensive retrofit. A protective sleeve, typically stainless steel, is placed over the magnets and sealed against the sucker-rod to preclude fluid from contacting the magnet. The stainless steel sleeve and magnet should not extend beyond the diameter of the largest diameter portion of the sucker-rod, which typically includes the couplings between sucker rod portions, so as to avoid loss of liquid volume in the tubing and to avoid interfering with up and down movement of the sucker rod. In particularly corrosive environments, other materials may be chosen for the sleeve, including, for example, titanium.

A magnet can also be placed below the subsurface pump to treat fluid magnetically prior to entering into the pump and tubing. The magnets are of similar construction as those described above, and are of larger diameter so as to line the inside of a section of tubing placed immediately below the pump barrel and of the same diameter as the pump barrel. These magnets are charged so that the magnetic field radiates most intensely in a radially inward direction whereas magnets mounted to the sucker rod are charged so that the magnetic field radiates most intensely in a radially outward direction. The section of tubing containing magnets below the pump may conveniently be termed the "magnet barrel." A stainless steel sleeve lines the inside of the magnets and is sealed against the inside diameter of the magnet barrel section beneath the pump barrel so as to preclude contact of fluid and magnet. Typically, the magnet barrel section is threadedly engaged with the pump barrel and provides a coaxial path for conveying fluid through the magnetic field and into the pump barrel.

Powerful neodymium or other rare earth magnets may be used in connection with the practice of the invention. Neodymium magnets typically include lesser amounts of iron and boron. Less powerful magnets can be used, but not necessarily with equivalent results. These magnets desirably are prepared individually as half cylinders for the configurations of a round sucker rod stem and magnet barrel. The magnets are not prepared as cylinders cut in half and maintaining the same polarity as the original cylinder. Instead, the magnets are individually prepared and charged so that each of the arcuate surfaces of one half has the same polarity, with the intensity of the field radiating either inwardly or outwardly, depending on whether the application is for a fluid flowing inwardly or outwardly of the magnet surfaces. The flat surfaces of the edges of the magnet that join the arcuate surfaces have the opposite polarity from the arcuate surfaces. The magnets are used in pairs as matched sets in which one magnet has arcuate surfaces of one polarity and the other magnet has arcuate surfaces of the opposite polarity. The likewise oppositely charged flat surfaces of these matched pairs of magnets provide for strong attractive forces by which the magnets may be conjoined.

In the sucker-rod pumping system, repetitive up and down movement of powerful rare earth magnets on the rod string within the production tubing creates an electrical potential. The invention also includes providing an electrical connection between the rod string and the production tubing to reduce static electrical discharges, which can cause electrolytic corrosion.

Thus, the invention provides, among other things, a sucker-rod pumping system in which powerful rare earth magnets have been constructed for significant monopolar character in which most of the surface of the magnet is of one charge and for circumscribing the rod string without interfering with the operation of the rod string and without direct contact with crude petroleum. The invention also provides similar magnets for use below the pump barrel and a mechanism for harnessing the electrical potential.

BRIEF DESCRIPTION OF THE DRAWINGS

Having described the invention in general terms, reference will now be made to the accompanying drawings, wherein.

DETAILED DESCRIPTION OF THE INVENTION

The invention will now be described more fully hereinafter with reference to the accompanying drawings, in which some, but not all concepts of the invention are illustrated. Indeed, the invention may be embodied in many different forms and should not be construed as limited to the examples set forth herein; rather, the embodiments provided in this disclosure are intended to satisfy applicable legal requirements.

Figure 1:
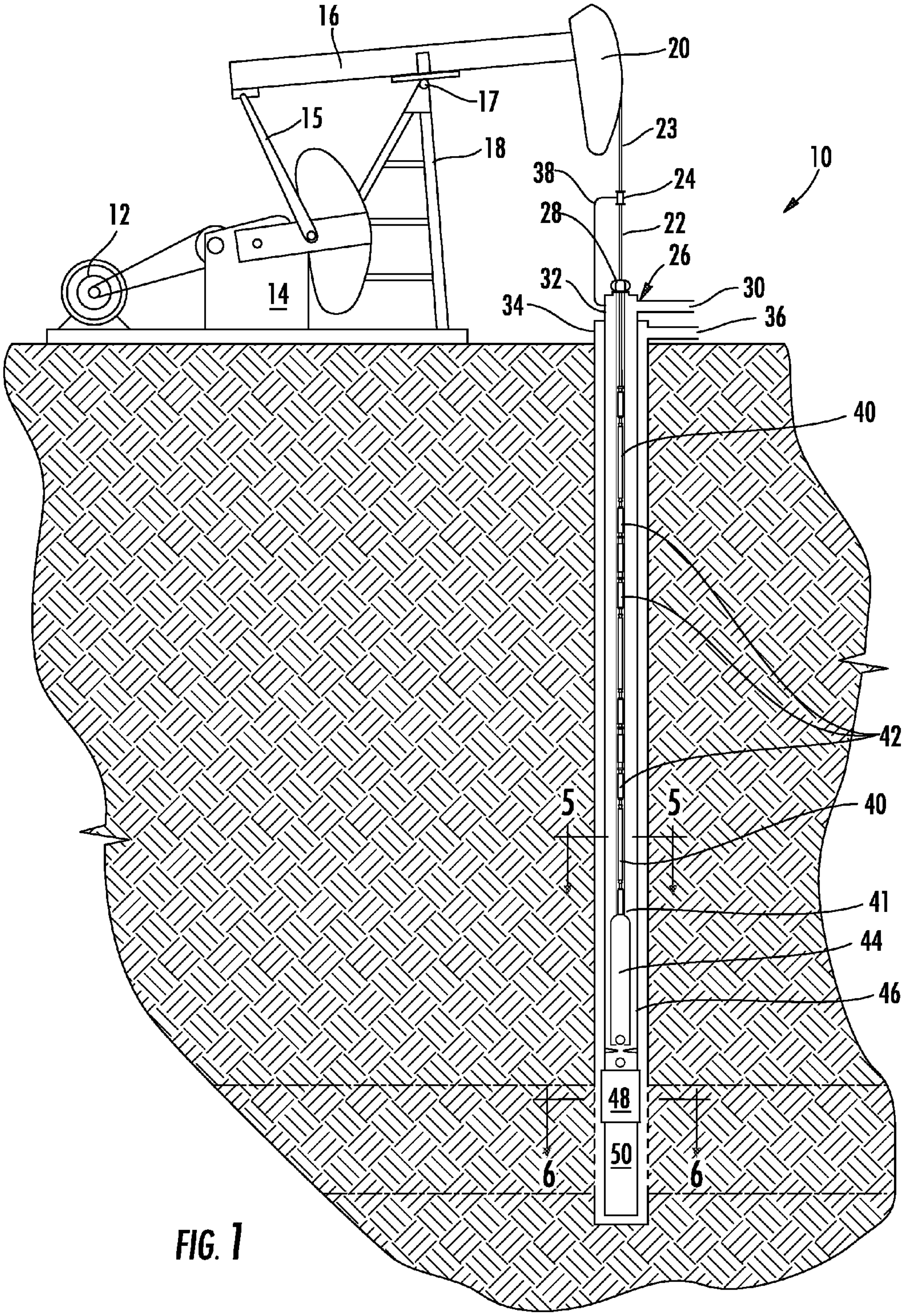
FIG. 1 illustrates in a schematic view the basic elements of a sucker-rod pumping system that included embodiments of the invention.

FIG. 1 illustrates generally at 10 a sucker-rod pumping system having a motor 12 acting as a prime mover and generating rotational motion. Above ground components include a motor 12, which may be powered by electricity, diesel fuel, or gasoline or any other source of power. A gear reducer 14 reduces the speed of rotation and provides the torque necessary to drive the sucker-rod pumping system. The gear reducer connects a counterbalanced crank arm 15 to a walking beam 16 mounted on Samson posts 18. The walking beam pivots up and down about saddle bearing 17, converting the rotational movement of the prime mover to the alternating up-and-down movement for driving the sucker rod pumping system. A horse head 20 connects the walking beam to a polished rod 22 to reduce lateral stress on the rod string so that the rod string of the sucker rod pumping system moves linearly up and down. A connector 24 connects the polished rod 22 to a hanger 23 associated with the horse head that travels with the rotation of the horse head to maintain the polished rod in a vertical orientation. A well head assembly 26, sometimes called a "Christmas tree," completes the above ground assembly as illustrated and provides a seal 28 against the polished rod to keep fluids in the well and a pumping tee 30 on production tubing 32 for removing oil to flow lines for storage or for further processing. Well bore casing 34 typically includes a vent 36 for removing fluids that may accumulate outside the production tubing, and provides a convenient path for the removal of gas that separates from liquids and accumulates in the annular space between the well bore casing and the production tube.

An electrical connection in accordance with the invention is illustrated at 38, establishing an electrical connection between the like-charged rod string coupling 24 and the production tube 32. The practice of the invention includes the up and down movement of powerful magnets within a metal production tube in a manner to be described, which generates an electrical potential. The rod string and production tube typically develop a negative charge and the fluid conveyed through the production tube develops a positive charge. Electrical connection 38 substantially reduces electrolytic corrosion in the system and is thought to assist in keeping paraffins and asphlatenes in solution and to preclude or at least reduce substantially the formation of scale deposits.

Below ground, the production tube 32 fits coaxially within well bore casing 34 and extends deep into the ground to locate a petroleum reservoir. The polished rod 22 is connected to the rod string of sucker rod component sections 40, which extend centrally of the production tube and form an annular space 41 through which pumped fluid travels. The sections of sucker rod, coupled by couplings 42, provide the mechanical link between the subsurface pump plunger 44 and the polished rod 22. The sucker rod string may be constructed of the length needed using sections of sucker rod and couplings as needed. One or more, and typically a plurality of sucker rod sections may include magnets fitted thereto in accordance with the invention in a manner to be described below. The terminus of the sucker rod is fitted with a pump plunger 44 as illustrated, which fits within a pump barrel 46 attached to the end of the production tubing and coextensive with the production tube. The pump barrel is threadedly attached to a magnet barrel 48 and a gas anchor 50 may be included at the terminus of the production tubing as well to separate gas from liquid and direct the gas to the annular space outside the production tubing.

It should be recognized that other arrangements can be used for sucker rod pumping and for other methods and apparatus for pumping oil. The invention can be used in connection with any of these and for treating other fluids. In the specific example of a sucker rod system, magnets as described are placed about the rod stem; however in other arrangements for fluid treatment, the magnets can be used to line a pipe or other fluid conduit, as in the magnet barrel as described, or to circumscribe a pipe or conduit, so long as the fluid disposed within is exposed to a magnetic field.

Figure 2:
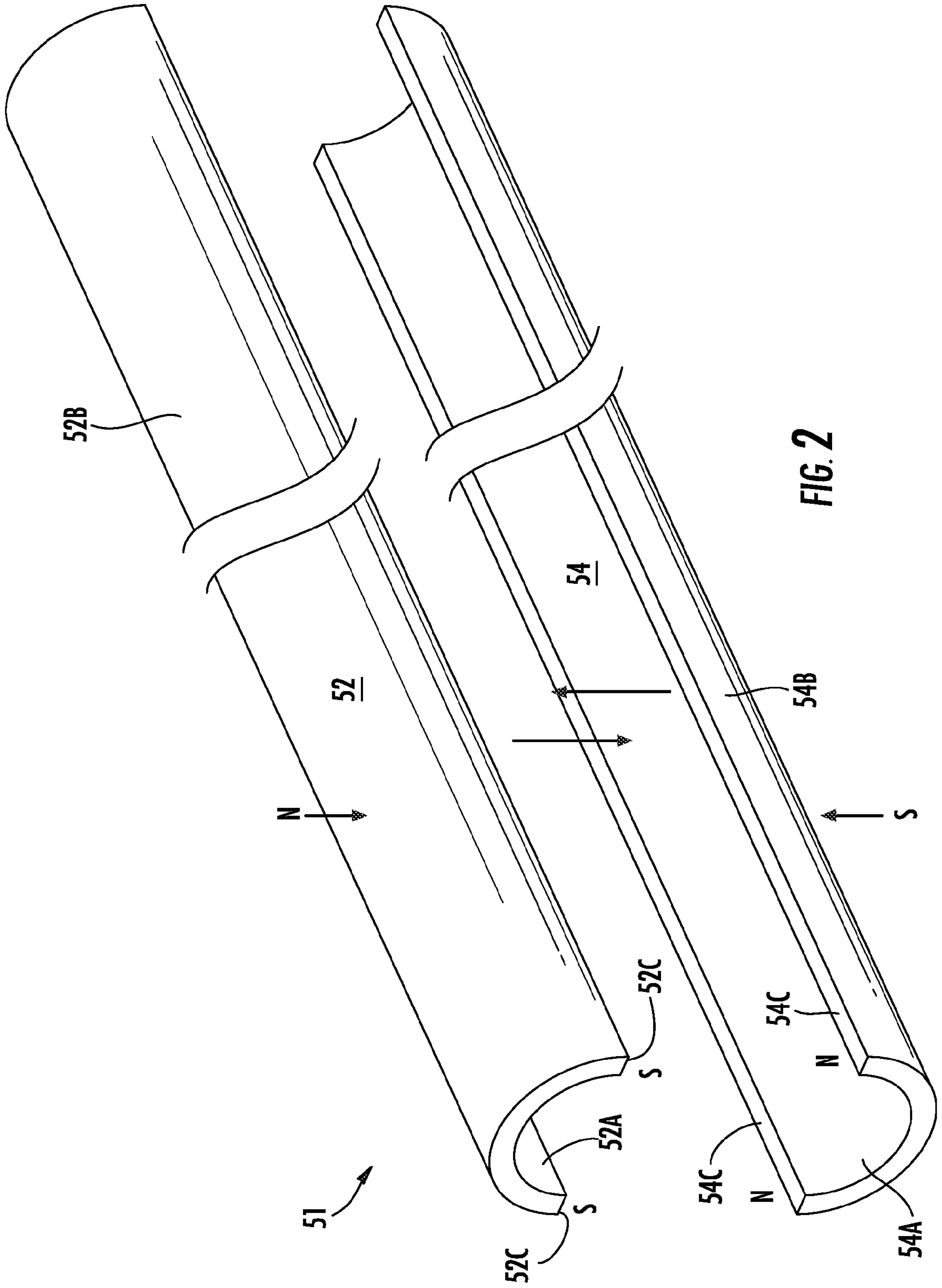
FIG. 2 illustrates a matched pair of magnets of the invention of the type that are used on the rod string of a sucker-rod pumping system or in the magnet barrel beneath the pump barrel.

Turning now to FIG. 2, FIG. 2 illustrates generally at 51 a matched pair of magnets 52, 54 in accordance with the invention. These magnets typically are prepared from rare earth metals and magnets comprising neodymium and have proved to be useful and to provide an intense magnetic field or flux. As illustrated in FIG. 2, magnets 52 and 54 have radially inner and outer arcuate surfaces, 52A, 52B and 54A, 54B, respectively, curved to form a semicircle for use in connection with the circular cross section of the sucker rod, although other arcuate shapes could be used, depending on the application. These arcuate surfaces extend axially in a longitudinal direction to form a half cylinder. The arcuate surfaces terminate transversely of the axis to form a pair of flat surfaces, 52C and 54C on magnets 52 and 54, respectively, and which connect the inner arcuate surface to the outer arcuate surface.

These magnets are not prepared as a cylinder that is cut in half, but are prepared individually and magnetized to develop a high degree of monopolar character. As illustrated, magnet 52 is diametrically charged, which is to say charged in a direction transverse to the longitudinal axis, and each of the inner and outer arcuate surfaces 52A and 52B have the same polarity, indicated in FIG. 2 to be North. Magnet 54 is diametrically charged and each of the inner and outer arcuate surfaces 54A and 54B have the same polarity, opposite from that of magnet 52, indicated in FIG. 2 to be South. The magnets are not in fact monopolar, and the flat longitudinal surfaces in each magnet are of opposite polarity to the arcuate surfaces in the same magnet. Thus, magnet 52 has flat surfaces 52C exhibiting a polarity of South, whereas the arcuate surfaces 52A and 52B are North. Likewise, the flat surfaces 54C of magnet 54 exhibit a polarity of North, whereas the arcuate surfaces 54A and 54B exhibit a polarity of South. Thus, by "matched" is meant that the magnets are prepared as a pair for use together, each magnet exhibiting a high degree of monopolar character and having a polarity opposite that of the other.

When placed about the narrow section of a sucker rod in a rod string, the flat surfaces of a matched pair of magnets contact each other to conjoin the magnets about the sucker rod string. When placed inside a metal tube, including a pump barrel, the flat surfaces of a matched pair of magnets contact each other to conjoin the magnets. Of course, if desired, the flat surfaces need not be in direct contact so long as the intensity of the magnetic field is sufficient to treat the fluid successfully. In other applications, the magnets can be placed so as to circumscribe a pipe or conduit for fluid travel.

Figure 3:
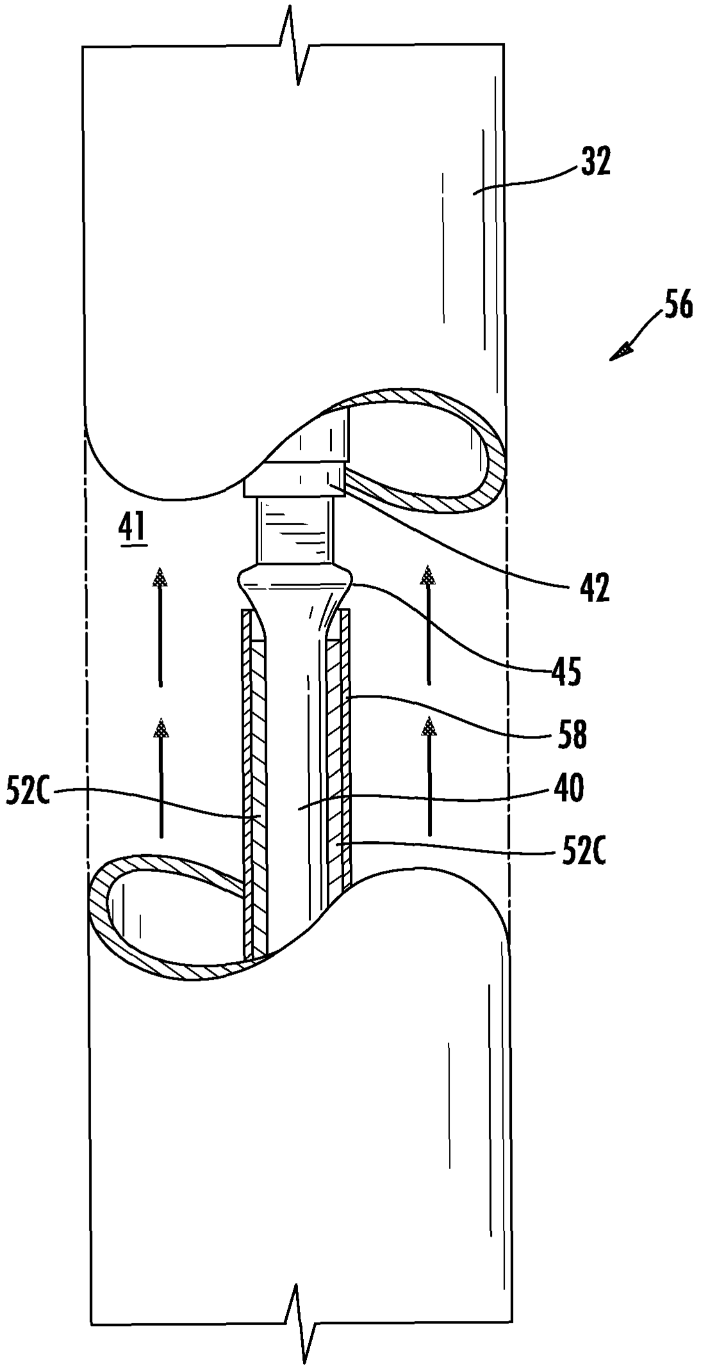
FIG. 3 illustrates a section of production tubing in a sucker-rod pumping system in a partially exploded view and, within the production tubing, a partial longitudinal section through a magnet and surrounding sleeve of the invention as fitted onto a section of the rod string.

FIG. 3 illustrates generally at 56 the magnets of the invention placed about a section of a sucker rod in the underground section of a sucker-rod pumping system. A section of sucker rod 40, which may vary in length from one to a few feet, terminates in a larger diameter end portion 45 that is attached to a coupling 42 and thereby coupled to another section of sucker rod, which is not show in this view. A rod string of a plurality of coupled sections 40 of sucker rod is illustrated in FIG. 1. The sucker rod is placed in the center of a production tube 32 and crude petroleum travels to the surface from an underground reservoir in the annular space 41 between the sucker rod and the production tube. The flats 52C of a magnet can be seen adjacent the narrow diameter portion of the sucker rod section 40. A stainless steel or other suitable metal jacket 58 surrounds the magnet and is sealed adjacent the large diameter portion 45 of the sucker rod, as by welding, to preclude contact of the magnet with crude oil, which would damage the magnet over time. It should be noted that the protective jacket and magnet are coaxial with the sucker rod and do not extend beyond the diameter of the coupling 42 and the large diameter end portion 45 so as not to interfere with operation of the sucker rod in the production tube and the egress of oil from the underground reservoir to the surface.

Figure 4:
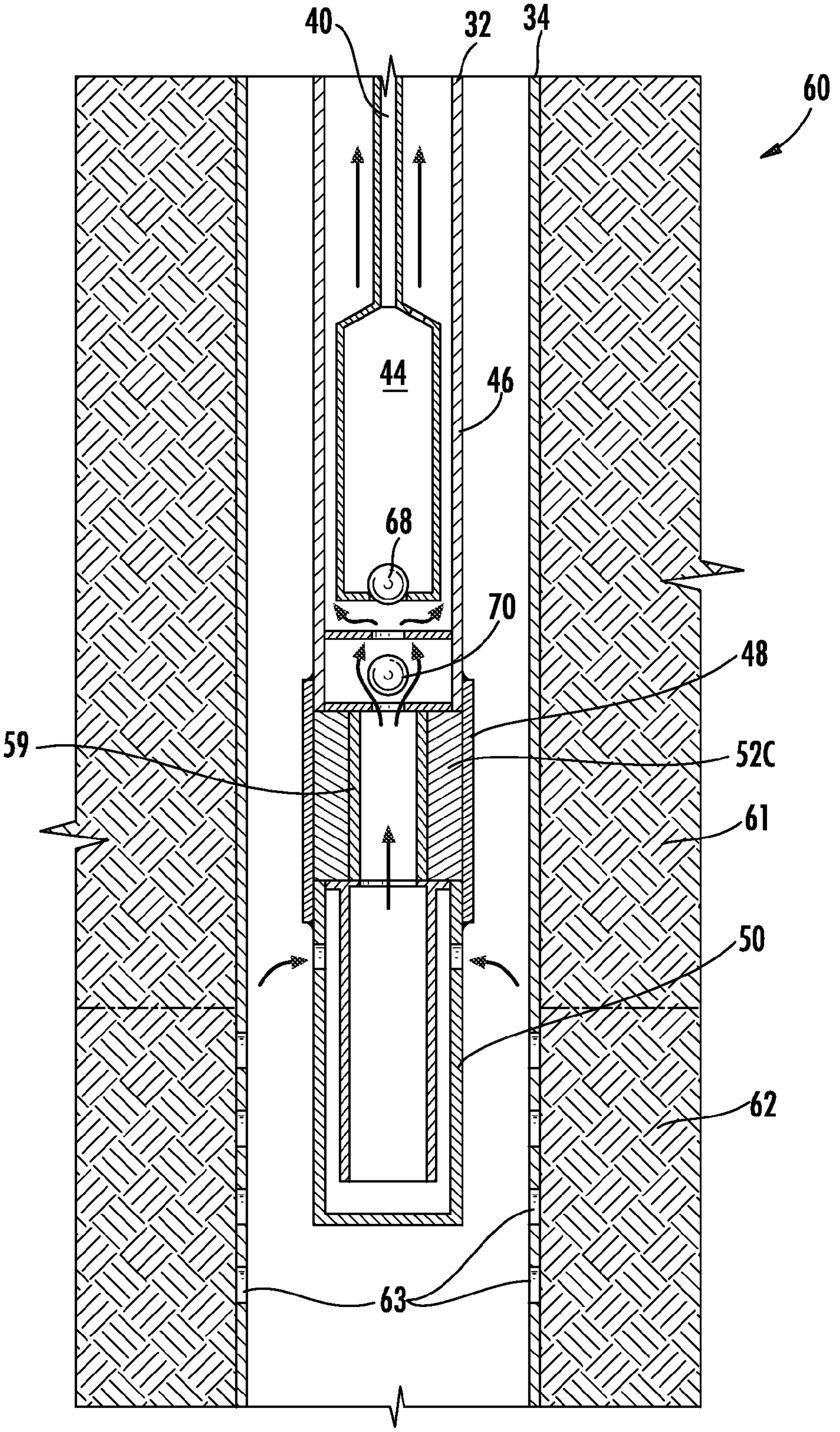
FIG. 4 illustrates in a partial longitudinal section the lower end of a sucker-rod pumping system, including the well bore casing within the ground and the coaxial production tube, including, from top to bottom, the rod string, pump barrel, pump plunger, traveling and fixed ball valves, magnet barrel, magnets, magnet liner, and gas anchor.

Turning now to FIG. 4, FIG. 4 illustrates generally at 60 the terminal portion of the rod string deep underground 61 in an oil reservoir 62. The well bore casing 34 contains a number of orifices 63 adjacent oil reservoir 62 through which crude oil enters the lowermost section of the well bore casing. Crude oil deep underground often contains dissolved gases and a gas anchor 50 may be included to separate the gas from liquid, to direct the gas to the surface through the annular space between the well bore casing 34 and the production tube 32, and to introduce liquid into the lowermost section of the production tube 32. Typically, the gas anchor is threadedly engaged to the lowermost section of pump barrel, 66, which is contiguous with the production tube. In the practice of the invention, a magnet barrel 48 can be inserted between the gas anchor 50 and pump barrel 66 to improve flow of petroleum into the pump. The magnet barrel is threaded for ease of installation on the rod string terminus and with a minimum of retrofit requirements. The magnet barrel is fitted with a matched pair of magnets 52, 54 as discussed in connection with FIG. 2 lining the inside of the barrel. The flats 52C of magnet 52 illustrated in FIG. 2 can be seen in section in FIG. 4. The magnets are lined with a stainless steel jacket 59 and sealed against contact with oil similar to the jacket 58 discussed in connection with the sucker rod in FIG. 3. It should be recognized that FIG. 2 illustrates the general shape of the magnets and that magnets 52 and 54 mounted in the magnet barrel will be of a different size than those mounted on a section of sucker rod in a rod string and will be charged so that the greatest intensity of magnetic filed radiates radially inwardly rather than radially outwardly.

Also shown in FIG. 4 is the pump plunger 44 and including a traveling ball valve 68 and a stationary ball valve 70 through which liquid is conveyed from the gas anchor 50 through the magnet barrel 48 into the production tube 32 to travel to the surface. The pump plunger operates as a positive displacement pump moved up and down by the sucker rod sections 40 to draw liquid into the production tube and pump it to the surface.

Figure 5:
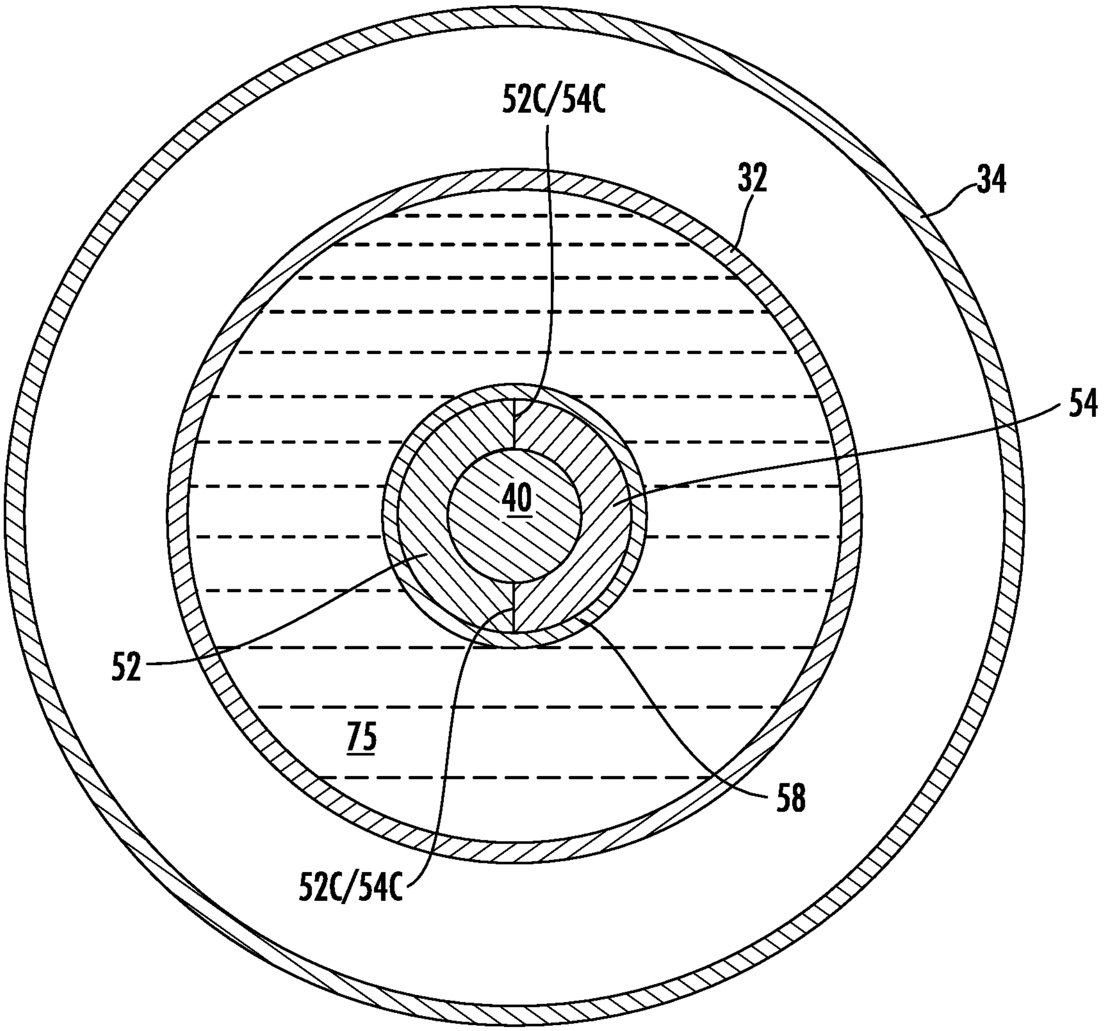
FIG. 5 illustrates in transverse section a view taken along line 5-5 of FIG. 1 through the well bore of a sucker-rod pumping system, including, from the inside out, the sucker rod, the matched pair of magnets, the magnet liner, the annular space through which fluid is conveyed through the production tube, the production tube, the annular space in which the production tube is coaxially located, and the well bore casing.

FIG. 5 illustrates an underground section through the well bore casing 34 taken along line 5-5 of FIG. 1 and shows the magnets 52 and 54 in conjoined relation mounted on the sucker rod 40, sealed by stainless steel jacket 58, and coaxially located within production tube 32 and well bore casing 34. The points at which the magnet flats are in contact are shown at 52C/54C. Liquid 75 illustrated in the annular space between the magnet sleeve 58 and the production tube 32 is subjected to a powerful magnetic flux by the magnets 52 and 54 emanating radially outwardly from the magnets along the entirety of their length. A nominal two-foot length of magnet has been determined to be useful in the practice of the invention, conveniently mounted on a two-foot sucker rod section. A plurality of such sections may be used, if desired.

Figure 6:
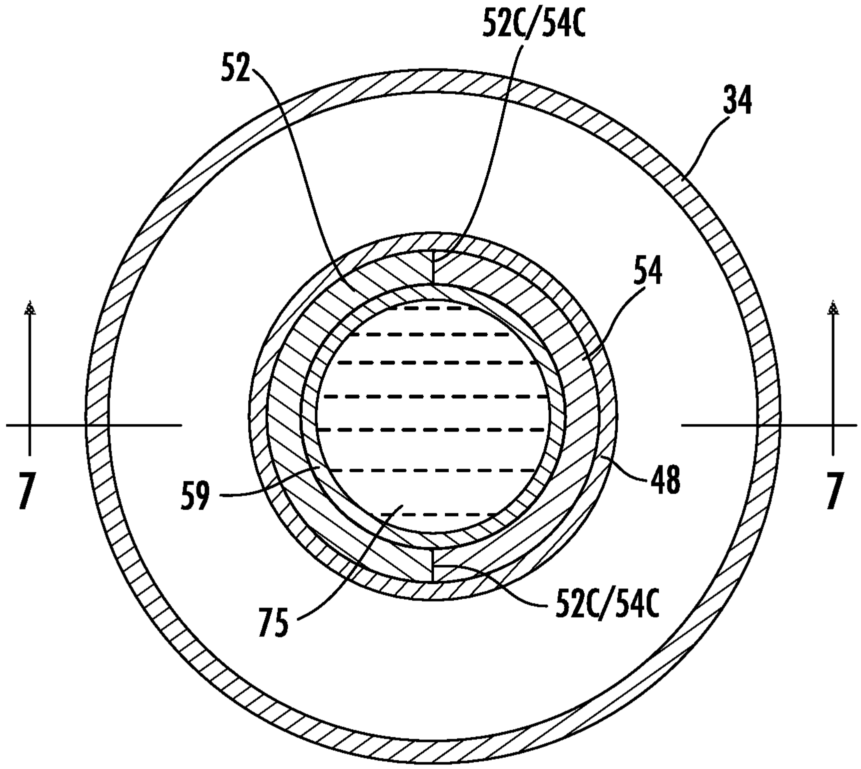
FIG. 6 illustrates in a transverse section a view taken along line 6-6 of FIG. 1 through the well bore of a sucker-rod pumping system, including, from the inside out, the central space in the magnet barrel through which fluid is conveyed to the pump, the magnet liner, the matched pair of magnets, the magnet barrel, the annular space in which the magnet barrel is located, and the well bore casing.

FIG. 6 illustrates an underground section through the well bore casing 34 taken along line 6-6 of FIG. 1 and shows the magnets 52 and 54 in conjoined relation mounted on the inside wall of the magnet barrel, cylinder 48, sealed by stainless steel jacket 59, and coaxially located within the well bore casing 34. The points at which the magnet flats are in contact are shown at 52C/54C. Liquid 75 illustrated within the area defined by the stainless jacket 59 is subjected to a powerful magnetic flux by the magnets 52 and 54 emanating radially outwardly from the magnets along the entirety of their length and substantially preclude deposition of scale and precipitation of solids from the liquid entering the pump. A two foot section of magnet has proved useful in treating the fluid entering the pump.

Figure 7:
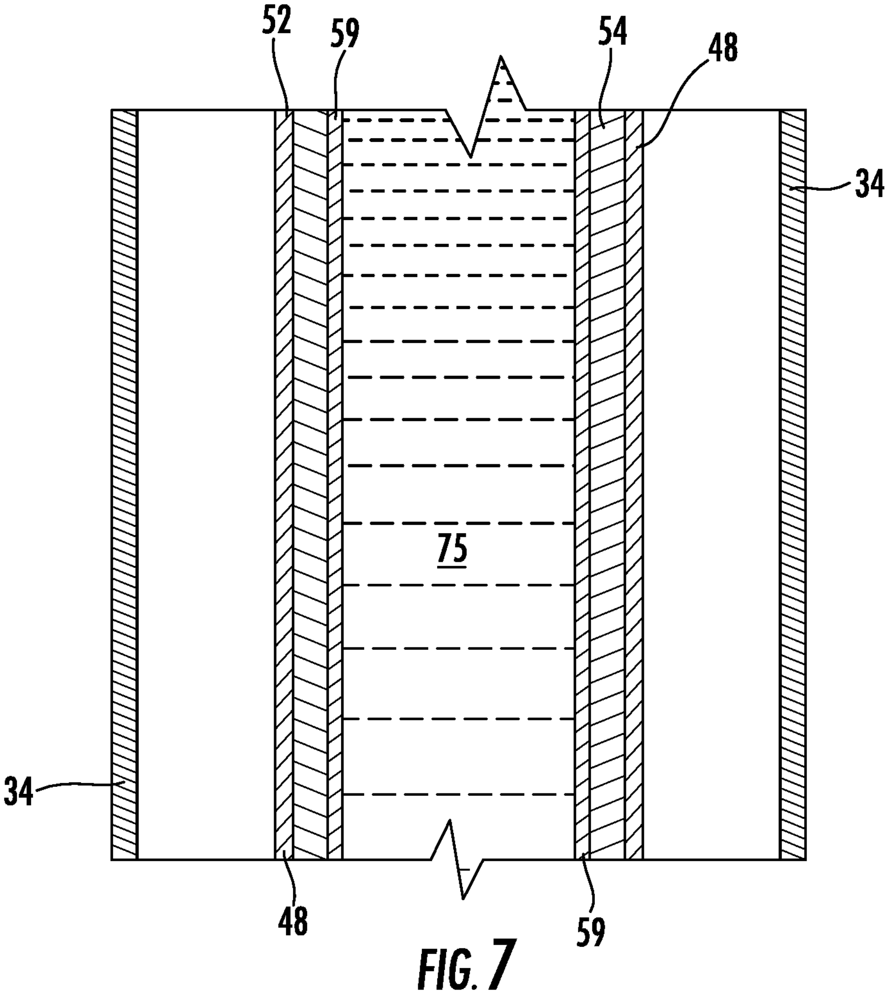
FIG. 7 illustrates in a longitudinal section a view taken along line 7-7 of FIG. 6.

FIG. 7 illustrates a longitudinal section taken along line 7-7 of FIG. 6 and shows the elements of the magnet barrel 48 in section along its length and the hollow cylinder formed by the two magnet sections 52 and 54 through which liquid 75 travels internally.

In practice, the rod string may become fatigued and break or some other operation necessitates that the operation of the well cease and that the rod string be removed from the well bore. The rod string may be fitted with new sections of sucker rod as desired having the magnets of the invention fitted thereto and with a magnet barrel as described. Thereafter, the rod string can be reinserted and operation of the well may be resumed in accordance with the invention.

It should be recognized that the magnets as described can be used in connection with magnetic conditioning of petroleum above ground and with a variety of fluids, including water, vegetable oils, liquid fats, and the like, and that the invention is not limited to the conditioning of crude petroleum. The magnets can be oriented for flow internally or externally by lining a conduit or jacketing a rod, as desired.

What is claimed is:

1. Apparatus for magnetically treating a flowing fluid, said apparatus comprising at least one matched pair of conjoined rare earth magnets of opposite polarity, each said magnet having radially inner and outer arcuate surfaces extending axially in a longitudinal direction and terminating in a transverse direction to form a pair of flat surfaces connecting said inner arcuate surface to said outer arcuate surface, each said magnet diametrically charged with its inner and outer arcuate surfaces having the same polarity and with its pair of flat surfaces having the same but opposite polarity of the arcuate surfaces, the pair of magnets conjoined by aligning said oppositely charged flat surfaces, whereby fluid flowing with respect to said pair of conjoined magnets is exposed to a magnetic field.

2. The apparatus of claim 1 wherein said rare earth magnets comprise neodymium.

3. The apparatus of claim 1 wherein said conjoined magnets form a hollow cylinder and fluid flows internally or externally of said cylinder.

4. The apparatus of claim 1 wherein said flowing fluid is selected from the group consisting of crude petroleum, refined petroleum, vegetable oil, and water.

5. The apparatus of claim 1 further comprising a conduit for fluid flow surrounding said at least one pair of conjoined magnets and forming an annular space therebetween through which fluid flows externally of said pair of magnets.

6. The apparatus of claim 5 further comprising a sucker-rod pumping system having a sucker rod traveling in said conduit and wherein said pair of magnets is conjoined about said sucker rod.

7. The apparatus of claim 6 further comprising a stainless steel jacket surrounding said pair of magnets on said sucker rod and sealed with respect to said sucker rod so as to preclude contact of fluid and magnet.

8. The apparatus of claim 1 further comprising a conduit for fluid flow surrounding at least one pair of magnets conjoined about the inner surface of said conduit and defining an internal hollow space through which fluid flows internally of said pair of magnets.

9. The apparatus of claim 8 wherein said apparatus further comprises a sucker-rod pumping system, including a pump barrel, and wherein said conduit is located below said pump barrel, said apparatus further comprising a stainless steel jacket surrounding said pair of magnets internally and sealed with respect to said conduit so as to preclude contact of fluid and magnet.

10. A method for exposing a fluid to a magnetic field comprising the steps of:

a) providing at least one matched pair of rare earth magnets of opposite polarity, each said magnet having radially inner and outer arcuate surfaces extending axially in a longitudinal direction and terminating in a transverse direction to form flat surfaces connecting said inner and outer arcuate surfaces, each said magnet diametrically charged with its inner and outer arcuate surfaces having the same polarity and with its pair of flat surfaces having the opposite polarity of the arcuate surfaces;

b) conjoining the at least one pair of magnets by their oppositely charged flat surfaces;

c) flowing fuid past the conjoined magnets, thereby exposing the fluid to a magnetic field.

11. The method of claim 10 wherein the fluid is crude petroleum, the rare earth magnet comprises neodymium, the step of conjoining the at least one pair of magnets by their oppositely charged flat surfaces comprises the step of placing a matched pair of magnets about a portion of a rod string in a sucker-rod pumping system for a down tube in an oil well, thereby conjoining the magnets about the rod string, and the step of flowing fluid past the conjoined magnets comprises operating the sucker-rod pumping system to withdraw crude petroleum from an underground reservoir through the down tube.

12. The method of claim 11 further comprising the step of sealing the magnets from direct contact with crude petroleum by encasing the magnets in a metal sleeve and sealing the sleeve against the rod string, thereby precluding direct contact of the magnets with crude petroleum.

13. The method of claim 11 further comprising the step of electrically connecting the down tube to the rod string.

14. The method of claim 13 wherein the step of electrically connecting the down tube to the rod string includes the step of precluding grounding of the electrical charge along the rod string.

15. The method of claim 10 wherein the fluid is crude petroleum, the rare earth magnet comprises neodymium, the step of conjoining the at least one pair of magnets by their oppositely charged flat surfaces comprises the step of lining the inside of a portion of a tube with the magnets and the step of flowing fluid past the conjoined magnets comprises the steps of connecting the tube and magnets in flow communication with the pump barrel of a pump for a sucker-rod pumping system and withdrawing crude petroleum from an underground reservoir through the tube lined with magnets and the pump barrel.

16. The method of claim 15 further comprising the step of precluding direct contact of the magnet with the petroleum.

17. A neodymium magnet comprising radially inner and outer arcuate surfaces extending axially in a longitudinal direction and terminating in a transverse direction to form a pair of flat surfaces connecting the inner and outer arcuate surfaces, said magnet diametrically charged and having its inner and outer arcuate surfaces of the same polarity and with its pair of flat surfaces having the opposite polarity of the arcuate surfaces.

18. The magnet of claim 17 wherein said magnet is one of a pair of magnets, each magnet in said pair being oppositely charged.

19. A sucker-rod pumping system for withdrawing crude petroleum from an underground reservoir and having a prime mover for generating rotary motion, a walking beam for converting rotary to alternating motion, a positive displacement pump, and a rod string for connecting the walking beam to the pump to drive the pump by alternating motion, said system further comprising:

a) at least one pair of oppositely charged magnets conjoined longitudinally over a portion of the rod string so as to enclose a portion of the rod string, each said magnet of said at least one pair of conjoined magnets having radially inner and outer arcuate surfaces extending axially in a longitudinal direction and terminating in a transverse direction to form a pair of flat surfaces connecting said inner arcuate surface to said outer arcuate surface, each said magnet diametrically charged with its inner and outer arcuate surfaces having the same polarity and with its pair of flat surfaces having the same but opposite polarity of the arcuate surfaces, the pair of magnets conjoined by aligning said oppositely charged flat surfaces, whereby crude petroleum flowing with respect to said pair of conjoined magnets is exposed to a magnetic field; and b) a sleeve over said conjoined magnets and sealed against the rod string so as not to interfere with the alternating motion of the rod string and to preclude direct contact of crude petroleum with said magnets, whereby said magnets expose crude petroleum moving past said rod string to a magnetic field.

20. A sucker-rod pumping system for withdrawing crude petroleum from an underground reservoir and having a prime mover for generating rotary motion, a walking beam for converting rotary to alternating motion, a down tube for connection to the underground reservoir, a positive displacement pump located in said down tube adjacent the underground reservoir, and a rod string for connecting the walking beam to the pump to drive the pump by alternating motion, said system further comprising:

a) a pump barrel adjacent the terminus of the down tube and circumscribing said positive displacement pump; and b) a magnet barrel fixed to said pump barrel, said magnet barrel circumscribing at least one pair of conjoined oppositely charged magnets, said conjoined magnets forming an internal hollow space through which crude petroleum flows, each said magnet of said at least one pair of conjoined magnets having radially inner and outer arcuate surfaces extending axially in a longitudinal direction and terminating in a transverse direction to form a pair of flat surfaces connecting said inner arcuate surface to said outer arcuate surface, each said magnet diametrically charged with its inner and outer arcuate surfaces having the same polarity and with its pair of flat surfaces having the same but opposite polarity of the arcuate surfaces, the pair of magnets conjoined by aligning said oppositely charged flat surfaces, whereby crude petroleum flowing with respect to said pair of conjoined magnets is exposed to a magnetic field.

* * * * *

UNITED STATES PATENT AND TRADEMARK OFFICE

CERTIFICATE OF CORRECTION

PATENT NO. : 8,414,776 B2
APPLICATION NO. : 12/682013
DATED : April 9, 2013
INVENTOR(S) : John T. Hale It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 482 days.

Signed and Sealed this
Eleventh Day of June, 2013

Teresa Stanek Rea
*Acting Director of the United States Patent and Trademark Office*